US008316422B2

(12) United States Patent
Hofmann et al.

(10) Patent No.: US 8,316,422 B2
(45) Date of Patent: Nov. 20, 2012

(54) PROPAGATION OF PRINCIPAL AUTHENTICATION DATA IN A MEDIATED COMMUNICATION SCENARIO

(75) Inventors: Christoph H. Hofmann, Wiesloch (DE); Martijn De Boer, Heidelberg (DE)

(73) Assignee: SAP AG, Walldorf (DE)

( * ) Notice: Subject to any disclaimer, the term of this patent is extended or adjusted under 35 U.S.C. 154(b) by 1053 days.

(21) Appl. No.: 11/582,036

(22) Filed: Oct. 17, 2006

(65) Prior Publication Data
US 2008/0091948 A1 Apr. 17, 2008

(51) Int. Cl.
*H04L 29/06* (2006.01)
(52) U.S. Cl. .................... 726/5; 726/6; 726/10
(58) Field of Classification Search .......... 713/155–159, 713/168–180, 182–186, 202; 709/229, 225; 726/8, 2–6, 10
See application file for complete search history.

(56) References Cited

U.S. PATENT DOCUMENTS

| | | | |
|---|---|---|---|
| 6,092,191 A | 7/2000 | Shimbo et al. | |
| 6,148,404 A * | 11/2000 | Yatsukawa | 726/2 |
| 6,243,466 B1 | 6/2001 | Young et al. | |
| 7,043,760 B2 * | 5/2006 | Holtzman et al. | 726/28 |
| 7,120,692 B2 * | 10/2006 | Hesselink et al. | 709/225 |
| 7,296,290 B2 * | 11/2007 | Barriga et al. | 726/8 |
| 7,526,799 B2 * | 4/2009 | Birk et al. | 726/9 |
| 2002/0087862 A1 | 7/2002 | Jain et al. | |
| 2003/0046551 A1 | 3/2003 | Brennan | |
| 2003/0163733 A1 * | 8/2003 | Barriga-Caceres et al. | 713/201 |
| 2004/0059942 A1 * | 3/2004 | Xie | 713/201 |
| 2004/0133499 A1 | 7/2004 | Mitreuter et al. | |
| 2004/0181665 A1 | 9/2004 | Houser | |
| 2005/0235153 A1 | 10/2005 | Ikeda | |
| 2005/0278528 A1 * | 12/2005 | Kathan | 713/168 |
| 2007/0113089 A1 * | 5/2007 | Yami et al. | 713/170 |
| 2007/0248050 A1 * | 10/2007 | Metke et al. | 370/331 |
| 2008/0091949 A1 * | 4/2008 | Hofmann et al. | 713/176 |
| 2008/0091950 A1 * | 4/2008 | Hofmann et al. | 713/176 |

OTHER PUBLICATIONS

IBM Corporation, J2EE Application Security, http://publib.boulder.ibm.com/infocenter/ieduasst/v1r1m0/index.jsp?topic=/com.ibm.iea.was_v6/was/6.0.1/Security/WASv601_Sec_J2EE_Security/player.html (http link on Dec. 4, 2009).*
"Final Office Action" mailed Aug. 12, 2010, for U.S. Appl. No. 11/582,105, entitled "System and Method to send a Message Using Multiple Authentication Mechanisms", filed Oct. 17, 2006, 14pgs.
"Non-Final Office Action" mailed Dec. 15, 2009, for U.S. Appl. No. 11/582,066, entitled "Propagation of Authentication Data in an Intermediary Service Component", filed Oct. 17, 2006, 17pgs.

(Continued)

*Primary Examiner* — Eleni Shiferaw
*Assistant Examiner* — Jing Sims
(74) *Attorney, Agent, or Firm* — Buckley, Maschoff & Talwalkar LLC

(57) ABSTRACT

A system may include a sender computing system, an intermediary component, and a receiver computing system. The sender computing system may transmit first authentication data and second authentication data, and the intermediary component may receive the first authentication data and second authentication data from the sender computing system, perform an authentication action based on the second authentication data, and transmit the first authentication data. The receiver computing system may receive the first authentication data.

22 Claims, 5 Drawing Sheets

OTHER PUBLICATIONS

"Non-Final Office Action" mailed Apr. 13, 2010, for U.S. Appl. No. 11/582,066, entitled "Propagation of Authentication Data in an Intermediary Service Component" filed Oct. 17, 2006, 13pgs.

"Non-Final Office Action" mailed Mar. 31, 2010, for U.S. Appl. No. 11/582,105, entitled "System and Method to send a Message Using Multiple Authentication Mechanisms" filed Oct. 17, 2006, 13pgs.

"Final Office Action" mailed Aug. 31, 2010, for U.S. Appl. No. 11/582,066, entitled "Propagation of Authentication Data in an Intermediary Service Component", filed Oct. 17, 2006, 18pgs.

"Advisory Action" mailed Oct. 26, 2010, for U.S. Appl. No. 11/582,105, entitled "System and Method to send a Message Using Multiple Authentication Mechanisms" filed Oct. 17, 2006, 3pgs.

"Advisory Action" mailed Nov. 17, 2010, for U.S. Appl. No. 11/582,066, entitled "Propagation of Authentication Data in an Intermediary Service Component", filed Oct. 17, 2006, 3pgs.

"Non-Final Office Action" mailed Aug. 17, 2011, for U.S. Appl. No. 11/582,066, entitled "Propagation of Authentication Data in an Intermediary Service Component", filed Oct. 17, 2006, 14pgs.

* cited by examiner

PROPAGATION OF PRINCIPAL AUTHENTICATION DATA IN A MEDIATED COMMUNICATION SCENARIO

FIELD

Some embodiments relate to propagation of authentication data from a sender computing system to a receiver computing system via an intermediary that requires other authentication data. In particular, some embodiments concern receiving first authentication data and second authentication data from the sender computing system, performing an authentication action using one of the first authentication data and the second authentication data, and propagating the other of the first authentication data and the second authentication data to the receiver computing system.

BACKGROUND

In a simple two-way communication between a sender computing system and a receiver computing system, the sender computing system may execute an application that transmits an electronic message to the receiver computing system. The message may include service data on which the receiver is to perform a service as well as authentication data identifying a user.

The identified user may be a principal under whom the application is executed in the sender, or a fixed anonymous user that is statically configured in the sender. The receiver uses the authentication data to perform an authentication action for logging the user into the receiver system. If the authentication action is successful, the receiver executes code under the user to perform the service on the service data.

As a result, the code (i.e., the receiver application) may be considered a part of the sender application executed under a same application user. This arrangement provides tailored application permissions in the receiver system and the ability to audit transactions in the receiver system caused by the application user.

A mediated communication scenario inserts an intermediary component between the sender and the receiver. The intermediary component may determine a receiver to which a message initiated by the sender is to be sent and may perform some transformation services on the message before forwarding the transformed message to the determined receiver. However, some authentication mechanisms rely on the integrity of the originally-sent message (i.e., the message must not be transformed). Moreover, the intermediary component itself may require authentication.

Systems are desired for efficiently enabling login of a sender computing system user at a receiver computing system in a mediated communication scenario.

DETAILED DESCRIPTION

Figure 1:
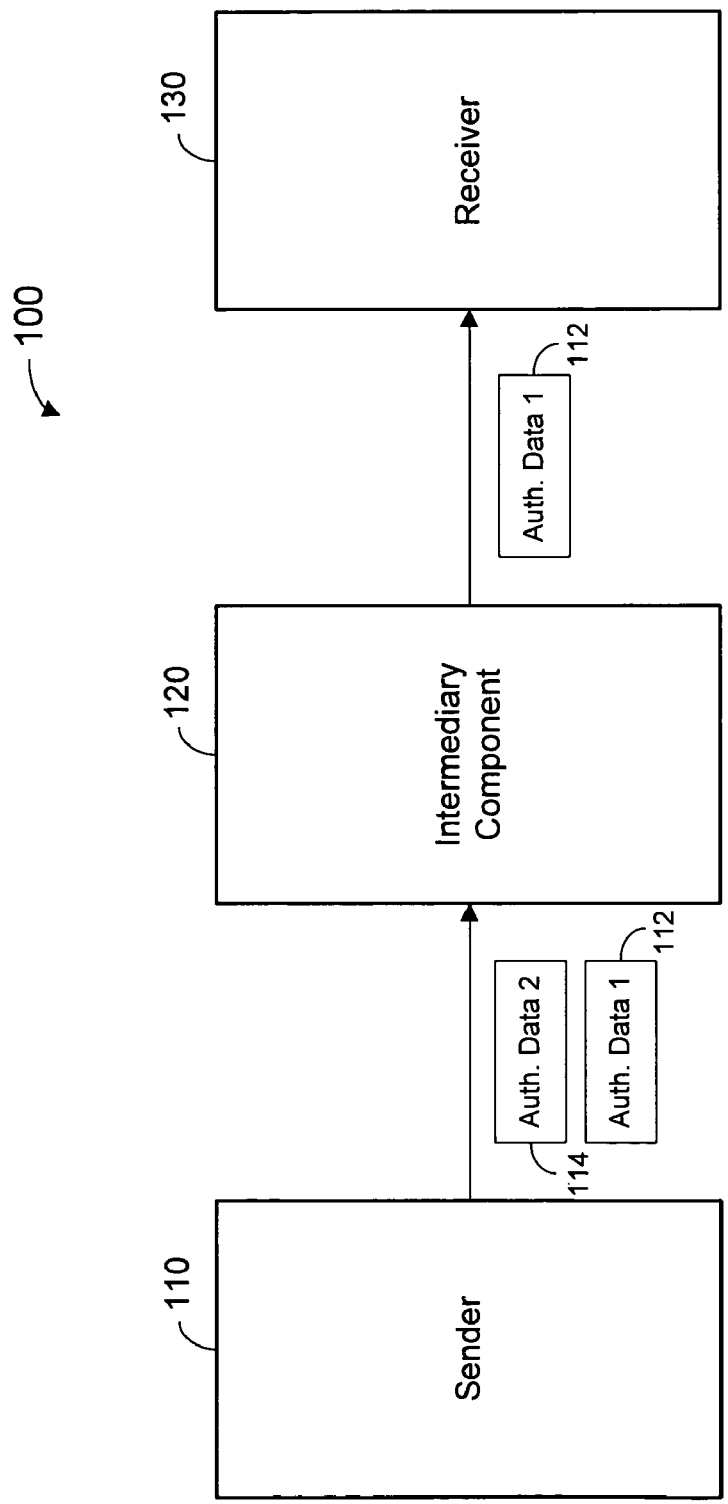
FIG. 1 is a block diagram of a system according to some embodiments.

FIG. 1 is a block diagram of system 100 according to some embodiments. System 100 illustrates a communication scenario in which intermediary component 120 provides mediated communication between sender 110 and receiver 130. Other topologies may be used in conjunction with other embodiments.

Two or more of the elements of system 100 may be located remote from one another and may communicate with one another via a network and/or a dedicated connection. Moreover, each displayed element of system 100 may comprise any number of hardware and/or software elements suitable to provide the functions described herein, some of which are located remote from each other.

According to some embodiments, sender 110 may comprise a sender application that requires a service from receiver 130, which may comprise a receiver application. Sender 110 transmits authentication data 112 and authentication data 114 to intermediary component 120 as shown. Authentication data 112 and authentication data 114 may be included in a single transmitted message according to some embodiments. Intermediary component 120 receives authentication data 112 and authentication data 114 from sender 110, performs an authentication action based on authentication data 114, and transmits authentication data 112 to receiver 130.

Authentication data 112 may identify a principal user under whom sender 110 is executing. Intermediary component 120 may therefore transmit authentication data 112 to receiver 130 in order to log the principal user into receiver 130. Authentication data 114 may be associated with an actual or fixed anonymous user known to component 120 and to sender 110. In a case that authentication data 114 is associated with a fixed anonymous user, intermediary component 120 might not be required to have any knowledge of the principal user.

Authentication data 112 and authentication data 114 may comprise any data based on which receiver 130 and intermediary component 120, respectively, may perform an authentication action. Non-exhaustive examples of authentication data include a username/password (e.g., basic mode or digest mode), a signature and associated X.509 certificate, and a signed assertion (e.g., an SAP® logon ticket, a Security Assertion Markup Language assertion). Authentication data 112 and authentication data 114 include data identifying a user (fixed or anonymous) as well as additional technical information required by the authentication mechanism with which the authentication data complies. Authentication data 112 and 114 may also or alternatively comprise any other currently- or hereafter-known types of authentication data.

In some embodiments, authentication data 112 transmitted from sender 110 to intermediary component 120 is in a different format and/or packaged differently from authentication data 112 transmitted from intermediary component 120 to receiver 130. For example, intermediary component 120 may extract principal data from authentication data 112 and recreate new authentication data 112 for transmission to receiver 130 based on the extracted data. Intermediary component 120 may map the extracted principal data to other principal data in some embodiments.

Moreover, authentication data 112 and 114 may be transmitted between the elements of system 100 on the transport level (e.g., sent via Hypertext Transfer Protocol communication mechanisms), the message level (e.g., within a Simple Object Access Protocol message), or in any other suitable manner.

According to some embodiments, sender 110 and/or receiver 130 comprises an Advanced Business Application Programming® (ABAP) business system that employs ABAP proxies to communicate with component 120 via a protocol native to component 120. In other embodiments, sender 110 and/or receiver 130 comprises a Java™ proxy executed by an SAP Adapter Engine™ to transmit/receive messages via the native protocol. Sender 110 and/or receiver 130 may also or alternatively transmit/receive messages via such an Adapter Engine using a protocol that is not native to intermediary component 120, in which case the Adapter Engine may exchange the message with component 120 using the native protocol. Sender 110 and/or receiver 130 may comprise another intermediary component which communicates with component 120 via the native protocol according to some embodiments. Each Adapter Engine and/or additional intermediary component requires a separate login and therefore must receive appropriate authentication data along with the propagated authentication data.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
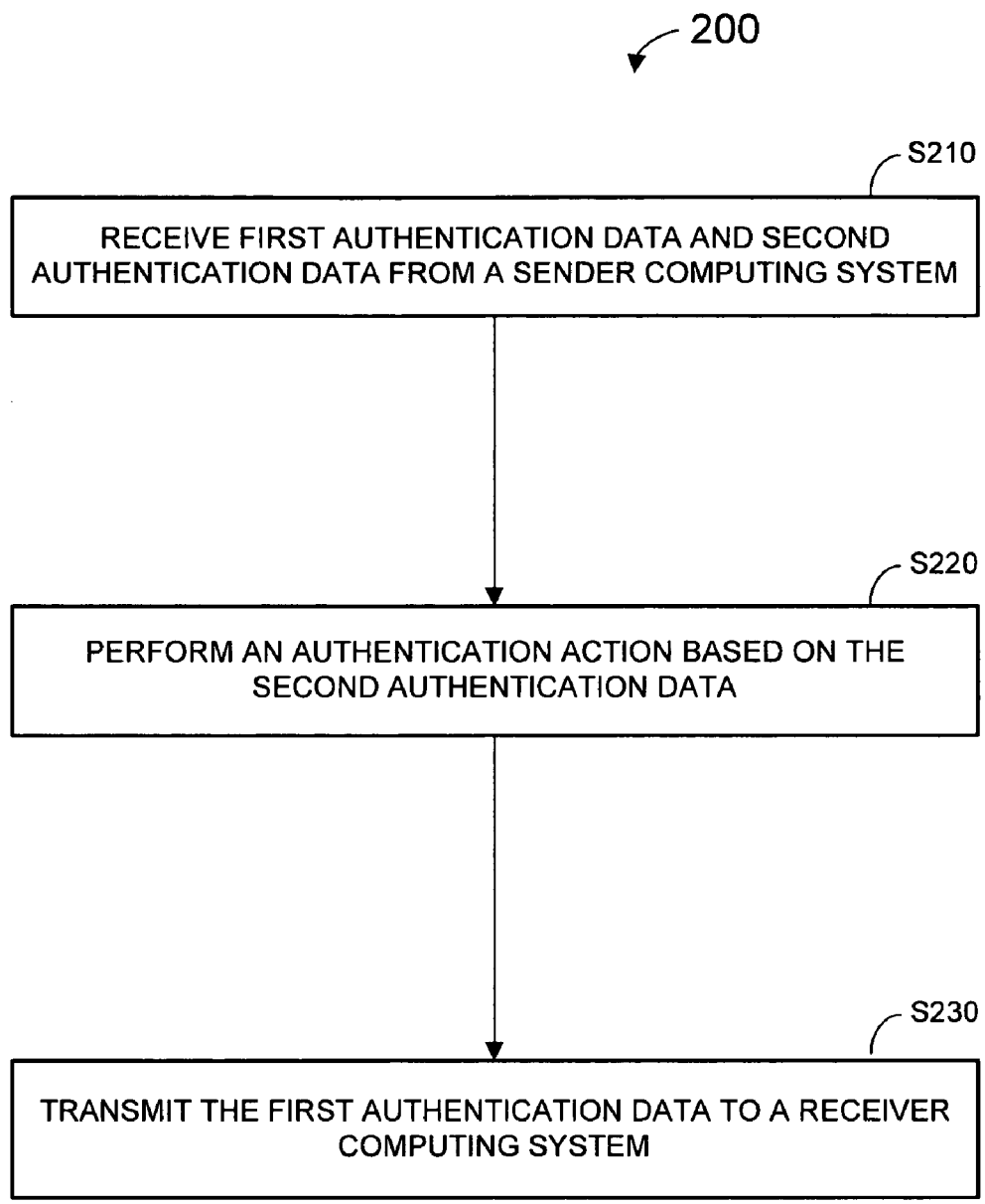
FIG. 2 is a flow diagram of a process according to some embodiments.

FIG. 2 is a flow diagram of process 200 according to some embodiments. Some embodiments of process 200 may provide propagation of principal authentication data in a mediated communication scenario. In some embodiments, intermediary component 120 executes program code to perform process 200.

Process 200 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, first authentication data and second authentication data are received from a sender computing system. According to some embodiments, the first authentication data and second authentication data are received together with a message. In this regard, the sender computing system may execute an application that requires a service of a receiver computing system. The sender computing system may execute the application under a principal user associated with the first authentication data and the application may transmit the first authentication data and the second authentication data prior to S210. The second authentication is therefore configured in the sender system prior to the above-mentioned transmission by the application.

The authentication data may be formatted according to any message format(s) and transport format(s) that are or become known, and may be received via any transport protocol(s) that is or becomes known. The first authentication data and the second authentication data may be included within a single message or may be received separately. According to some embodiments of S210, the first authentication data may be received before or after the second authentication data is received. Alternatively, the first authentication data and the second authentication data may be received simultaneously.

An authentication action is performed at S220 based on the received second authentication data. The authentication action may be performed using any authentication mechanism that is associated with the second authentication data. For example, in a case that the second authentication data (e.g., authentication data 114) comprises a username/password, the authentication action performed at S220 may comprise checking the username/password against stored authentication data.

The first authentication data is then transmitted at S230 to a receiver computing system. As mentioned above, the first authentication data may be associated with a principal user under which an application is executed by the sender computing system. Accordingly, the receiver computing system may use the first authentication data to log the principal user into the receiver computing system and to execute an application under the principal user.

Figure 3:
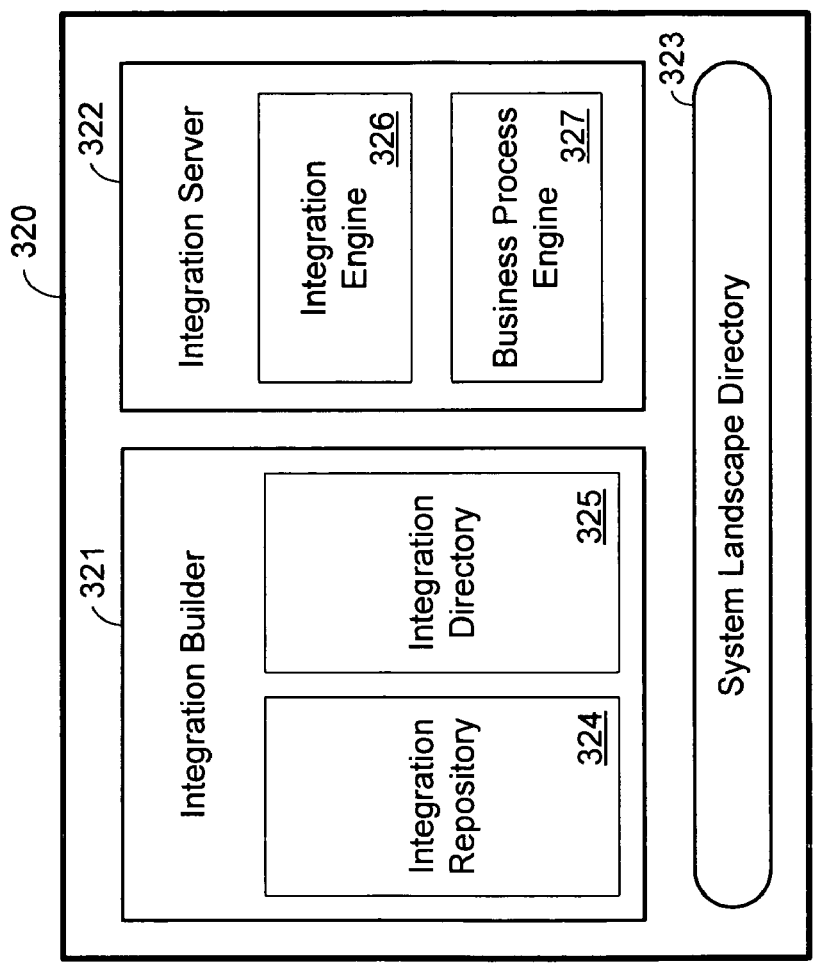
FIG. 3 is a block diagram of an intermediary component according to some embodiments.

FIG. 3 is a functional block diagram of intermediary component 320 according to some embodiments. Intermediary component 320 may comprise an implementation of intermediary component 120 of FIG. 1. In some embodiments, intermediary component 320 implements the SAP Exchange Infrastructure™.

Intermediary component 320 includes integration builder 321, integration server 322 and system landscape directory 323. Integration builder 321 allows editing of data relevant to interapplication communication. This data may be stored in integration repository 324 and integration directory 325.

Integration repository 324 includes information documenting a logical collaborative process and required interfaces. More particularly, integration repository 324 may include integration scenarios to describe communication between applications, and integration processes to be executed by integration server 322. Integration repository 324 may also define structure or value mappings between messages that may be exchanged using disparate interfaces, context objects to mask elements or attributes in a message payload, and types to describe the structure of messages to be exchanged using message interfaces. System landscape directory 323 may define a subset of possibly relevant software components that may be used to limit the amount of information stored in integration repository 324.

Integration directory 325 includes information for configuring the logical collaborative process of integration repository 324 to a particular system landscape. This information may define conditions for message flow and design objects. System landscape directory 323 defines the particular system landscape to which integration directory 325 configures the collaborative process.

Integration server 322 is a distribution engine for interapplication messages at runtime, and integration engine 326 is the central runtime component of integration server 322. During runtime, integration engine 326 may use integration directory 325 to determine a receiver of an inbound message, to determine an interface to be used in transmitting the message to the receiver, to determine whether the inbound message must be mapped based on the determined receiver, to call any required mapping program, and to transmit the thus-processed message. Business process engine 327 may execute integration processes by communicating with integration engine 326 to execute mappings and to send and receive messages.

Figure 4:
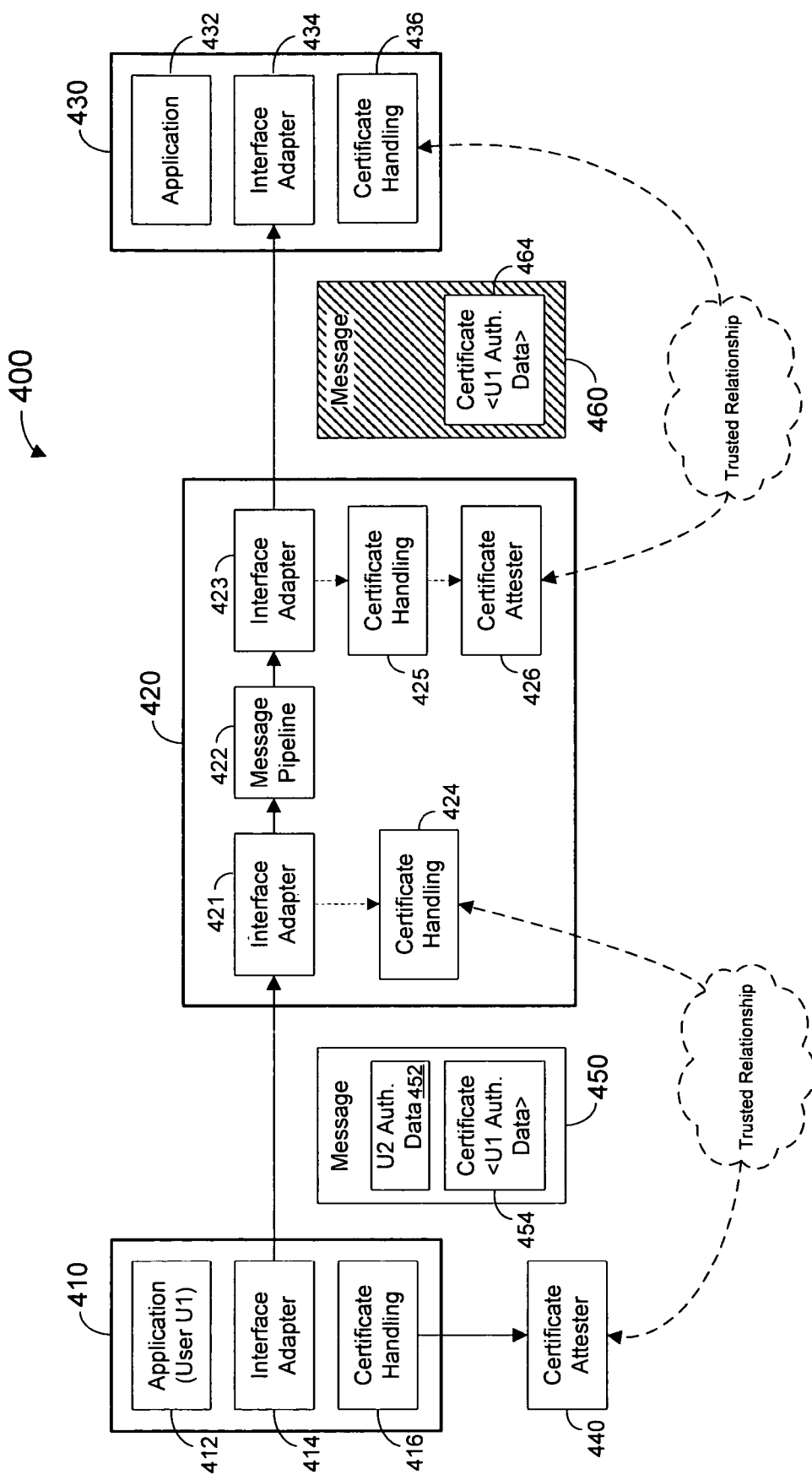
FIG. 4 is a block diagram of a system to propagate principal authentication from a sender to a receiver through an intermediary component according to some embodiments.

FIG. 4 is a detailed block diagram of system 400 according to some embodiments. System 400 may comprise an implementation of system 100 of FIG. 1. Accordingly, component 420 of system 400 may execute process 200 in some embodiments.

System 400 includes sender computing system 410, intermediary component 420 and receiver computing system 430. The foregoing elements may operate as described above with respect to respective elements 110, 120 and 130. A detailed operation of system 400 according to some embodiments will be described below with respect to FIG. 5.

Sender computing system 410 may comprise any system capable of executing program code, and includes application 412, interface adapter 414 and certificate handling 416. Application 412 may comprise an application desiring service from receiver computing system 430, and interface adapter 414 may provide communication via a protocol that is supported by intermediary component 420. Certificate handling 416 may operate in conjunction with certificate attester 440 to provide system 410 with the ability to secure messages using digital signatures and attester certificates. The illustrated elements of system 410 may represent program code providing the particular functions described above.

As shown, interface adapter 414 may transmit message 450 to intermediary component 420. Message 450 includes assertion 454 and may also include or have authentication data 452 attached thereto. Authentication data 452 may be associated with an actual or fixed anonymous user (U2) known to component 420.

Assertion 454 may include authentication data associated with principal user U1, under whom application 412 is executed, a signature of message 450 (including assertion 454) by an attester, and the attester's certificate. Signing of message 450 may serve to bind the authentication data to message 450.

Interface adapter 421 of intermediary component 420 is to receive message 450 from system 410, message pipeline 422 is to apply any required processing to message 450, and interface adapter 423 is to transmit processed message 460 to receiver computing system 430. Intermediary component 420 may be implemented by an integration server such as integration server 320 of FIG. 3.

Intermediary component 420 also includes certificate handling block 424, certificate handling block 425 and certificate attester 426. Generally, block 424 performs an authentication action based on received assertion 454. The authentication action may comprise a validity check of assertion 454 that evaluates the attester's signature and the trustworthiness of the attester certificate based on a trusted relationship with the attester. Since the authentication data of assertion 454 is not used for authentication in component 420, the corresponding principal user need not be maintained or otherwise known to component 420.

Block 425 operates in conjunction with certificate attester 426 to create second assertion 464 including the authentication data associated with principal user U1, an attester's signature of message 460, and a second attester certificate. The authentication data associated with principal user U1 that was received from system 410 may be mapped to other authentication data associated with principal user U1 for inclusion into second assertion 464 according to some embodiments.

Second assertion 464 is included in message 460 prior to transmission to system 430, thereby re-authenticating principal user U1. Message 460 may include additional authentication data in a case that an intermediary component implementing a protocol similar to component 420 is disposed between component 420 and receiver 430.

Receiver computing system 430 includes application 432, interface adapter 434 and certificate handling 436. Application 432 may be capable of providing the service required by application 412 of sender computing system 410, and interface adapter 434 may support communication with interface adapter 423 of intermediary component 420. Certificate handling 436 may perform an authentication action based on second assertion 464 and on a trusted relationship with block 425. If the action is successful, the authentication data associated with principal user U1 may be used to login to receiver 430 and to execute application 432 under principal user U1 so as to provide the requested service.

Figure 5:
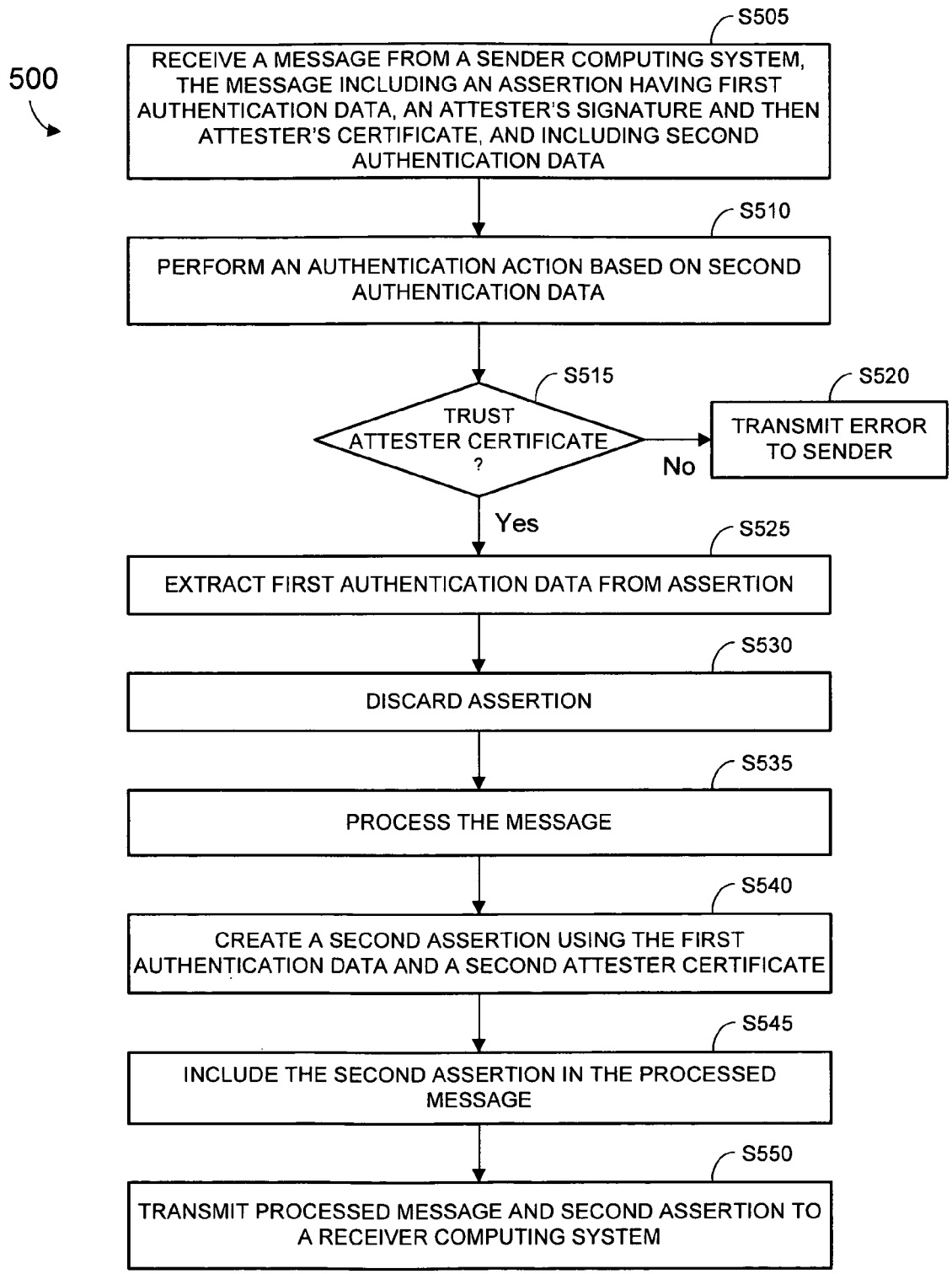
FIG. 5 is a flow diagram of a process executed by the FIG. 4 system according to some embodiments.

FIG. 5 comprises a flow diagram of process 500 according to some embodiments. Some embodiments of process 500 may provide propagation of principal authentication data in a mediated communication scenario. In some embodiments, intermediary component 420 of FIG. 4 executes program code to perform process 500.

According to process 500, a message is received from a sender computing system at S505. The message includes an assertion and second authentication data. The assertion includes first authentication data, an attester's signature of the entire message, and the attester's certificate. The signature may server to securely bind the first authentication data to the message. As one example of S505, interface adapter 421 of intermediary component 420 may receive message 450 from interface adapter 414.

In more detail, application 412, executing under principal user U1, may use interface adapter 414 to generate a proxy object of executable interfaces for communicating with component 420. The proxy object may create message 450 including authentication data 452 associated with an actual or fixed anonymous user (U2) known to component 420 and to sender 410. The proxy object may also interact with certificate handling 416 to obtain a certificate from certificate attester 410 and to include assertion 454 in message 450. As described above, assertion 454 includes an attester's signature, the attester's certificate and authentication data associated with principal user U1. According to some embodiments, the proxy object and interface adapter 414 also operate to transmit message 450 via the Web Services protocol.

Next, at S510, an authentication action is performed based on the second authentication data. The authentication action may be performed using any authentication mechanism that is associated with the received second authentication data. For example, in a case that the second authentication data (e.g., U2 authentication data) comprises a username/password, the authentication action performed at S510 may comprise checking the username/password against stored authentication data.

If the authentication action is successful, the attester's signature and attester certificate of the assertion are checked at S515. Certificate handling block 424 of the FIG. 4 system may perform the check at S515. The check may include checking the validity of the signature and identifying that the attester certificate was issued by a trusted certificate attester. In the present example of FIG. 4, the determination at S515 is affirmative because a trusted relationship exists between block 424 and certificate attester 440. If the determination is negative, an error is transmitted to sender 410 at S520.

The first authentication data is extracted from the assertion at S525. This extraction may also be performed by block 424 of component 420. The assertion may then be discarded at S530 for security purposes. Steps S510 through S530 may be performed as a single atomic step to guard against possible attackers.

Next, the received message is processed at S535. The message may be processed in any desired manner. According to some embodiments, a transport level protocol of the received message is changed to a different transport level protocol. In some embodiments of S535, message pipeline 422 may map the message based on receiver 430 and/or may execute integration processes on message 450 to generate a processed message. Generally, message pipeline 422 may process message 450 in order to provide messaging-related services to sender 410 and receiver 430. Such services may include message processing at the transport level, message processing at the message level, and/or any other desired message processing. In some embodiments, intermediary component 420 provides dynamic routing of messages received from sender 410 and/or mapping of message contents based on different message formats supported by sender 410 and receiver 430.

A second assertion is created at S540 using the first authentication data, a second attester signature, and a second attester certificate. According to some embodiments of S540, block 425 operates in conjunction with certificate attester 426 to create a second assertion including the authentication data associated with principal user U1, a second attester's signature, and a second attester certificate. The authentication data of the second assertion may be mapped such that it is different from the authentication data of the first assertion, but also associated with principal user U1.

The second assertion is included in the processed message at S545, and the processed message and the second assertion are transmitted to a receiver computing system at S550. With reference to FIG. 4, processed message 460 including second assertion 464 is transmitted to receiver 430 at S550.

According to some embodiments, interface adapter 434 receives message 460 from interface adapter 423 of intermediary service component 420 and certificate handling 436 performs an authentication action based on second assertion 464 and on a trusted relationship with certificate attester 426. The authentication action may comprise evaluating the validity of the second attester's signature and the trustworthiness of the second attester certificate. After successful authentication, the authentication data associated with principal user U1 may be used to login to receiver 430 and to execute application 432 under principal user U1.

In some embodiments, a communication scenario may include two or more intermediary components. For example, communication between a first intermediary component and a second intermediary component may include authentication data associated with principal user U1 and additional authentication for logging in to the second intermediary component.

The embodiments described herein are solely for the purpose of illustration. Those skilled in the art will recognize other embodiments may be practiced with modifications and alterations limited only by the claims.

What is claimed is:

1. A method comprising:
   receiving, by an intermediary component that includes a processor to execute program code, a message including first authentication data and second authentication data from a sender computing system, the first authentication data being associated with a first user, the second authentication data being associated with a second user different than the first user;
   performing, by the intermediary component, an authentication action based on the second authentication data received from the computing system;
   mapping, by the intermediary component, the first authentication data that is from the sender computing system and associated with the first user to third authentication data that is associated with the first user but different from the first authentication data;
   creating an assertion including the third authentication data and an attester certificate; and
   transmitting, by the intermediary component, the assertion to a receiver computing system after performing the authentication action and without transmitting the second authentication data to the receiver computing system;
   wherein the transmitting the assertion to a receiver computing system comprises:
   transmitting the assertion to a receiver computing system configured to use the third authentication data to log the first user into the receiver computing system.

2. A method according to claim 1, wherein receiving a message including the first authentication data and the second authentication data comprises:
   receiving a message including the second authentication data and an assertion including the first authentication data, an attester's signature of the message and an attester certificate.

3. A method according to claim 2, the method further comprising:
   determining whether the attester's signature is valid; and
   determining whether the attester certificate of the assertion that includes the first authentication data is trusted.

4. A method according to claim 3, wherein transmitting the assertion to a receiver computing system after performing the authentication action comprises:
   transmitting the assertion to a receiver computing system only if the authentication action based on the second authentication data is successful, the attester's signature of the assertion that includes the first authentication data is valid and the attester certificate of the assertion that includes the first authentication data is trusted.

5. A method according to claim 1, the method further comprising:
   processing the message prior to creating the assertion,
   wherein transmitting the assertion comprises transmitting the processed messages and the assertion to the receiver computing system.

6. A method according to claim 1, wherein the first authentication data associated with the first user includes a username and password and wherein the second authentication data associated with the second user different than the first user includes a username and password.

7. A method according to claim 1, wherein the transmitting the assertion to a receiver computing system configured to use the assertion to log the first user into the receiver computing system comprises:
   transmitting the assertion to a receiver computing system configured to use the assertion to log the first user into the receiver computing system and to execute an application under the first user.

8. A method according to claim 1, further comprising not using the first authentication data for authentication between the receiving of the message and the transmitting the assertion to the receiver computing system.

9. A non-transitory medium storing processor-executable program code, the program code comprising:
   code to receive, by an intermediary component, a message including first authentication data and second authentication data from a sender computing system, the first authentication data being associated with a first user, the second authentication data being associated with a second user different than the first user;

code to perform, by the intermediary component, an authentication action based on the second authentication data received from the sender computing system;

code to map, by the intermediary component, the first authentication data that is from the sender computing system and associated with the first user to third authentication data that is associated with the first user but different from the first authentication data;

code to create an assertion including the third authentication data and an attester certificate; and code to transmit, by the intermediary component, the assertion to a receiver computing system after performance of the authentication action and without transmission of the second authentication data to the receiver computing system;

wherein the code to transmit the assertion to a receiver computing system comprises:

code to transmit the assertion to a receiver computing system configured to use the third authentication data to log the first user into the receiver computing system.

10. A medium according to claim 9, wherein the code to receive a message including the first authentication data and the second authentication data comprises:

code to receive a message including the second authentication data and an assertion including the first authentication data, an attester's signature of the message, and an attester certificate.

11. A medium according to claim 10, the program code further comprising:

code to determine whether the attester's signature is valid; and code to determine whether the attester certificate of the assertion that includes the first authentication data is trusted.

12. A medium according to claim 9, the program code further comprising:

code to process the message prior to creating the assertion, wherein the code to transmit the assertion comprises code to transmit the processed message and the assertion to the receiver computing system.

13. A medium according to claim 9, wherein the first authentication data associated with the first user includes a username and password and wherein the second authentication data associated with the second user different than the first user includes a username and password.

14. A medium according to claim 9, wherein the code to transmit the assertion to a receiver computing system configured to use the assertion to log the first user into the receiver computing system comprises:

code to transmit the assertion to a receiver computing system configured to use the assertion to log the first user into the receiver computing system and to execute an application under the first user.

15. A medium according to claim 9, the program code not comprising code to use the first authentication data for authentication between the receiving of the message and the transmitting the assertion to the receiver computing system.

16. A system comprising:

a sender computing system to transmit a message including first authentication data and second authentication data, the first authentication data being associated with a first user, the second authentication data being associated with a second user different than the first user;

an intermediary component to execute program code to receive the message including the first authentication data and second authentication data from the sender computing system, to perform an authentication action based on the second authentication data, to map the first authentication data that is from the sender computing system and associated with the first user to third authentication data that is associated with the first user but different from the first authentication data, to create an assertion including the third authentication data, an attester's signature and an attester certificate and to transmit the assertion after performance of the authentication action and without transmission of the second authentication data; and a receiver computing system to receive the assertion transmitted by the intermediary component without transmission of the second authentication data and to use the third authentication data to log the first user into the receiver computing system.

17. A system according to claim 16, wherein reception of a message including the first authentication data and second authentication data from the sender computing system comprises:

reception of a message including the second authentication data and an assertion including the first authentication data, an attester's signature of the message, and an attester certificate.

18. A system according to claim 17, wherein the intermediary component is to determine whether the attester's signature of the assertion that includes the first authentication data is valid and to determine whether the attester certificate of the assertion that includes the first authentication data is trusted.

19. A system according to claim 16, wherein the intermediary component is to process the message prior to creating the assertion, and wherein transmission of the assertion comprises transmission of the processed message and the assertion to the receiver computing system.

20. A system according to claim 16, wherein the receiver computing system is further to execute an application under the first user.

21. A system according to claim 16, wherein the intermediary component is not to use the first authentication data for authentication between the receiving of the message and the transmitting the assertion to the receiver computing system.

22. A system according to claim 16, wherein the first authentication data associated with the first user includes a username and password and wherein the second authentication data associated with the second user different than the first user includes a username and password.

* * * * *